United States Patent
Oyama

(10) Patent No.: US 7,312,783 B2
(45) Date of Patent: Dec. 25, 2007

(54) LIGHT EMITTING ELEMENT DRIVE DEVICE AND DISPLAY APPARATUS

(75) Inventor: Yoshiki Oyama, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/247,665

(22) Filed: Oct. 11, 2005

(65) Prior Publication Data

US 2006/0082529 A1    Apr. 20, 2006

(30) Foreign Application Priority Data

Oct. 14, 2004  (JP)  ............... 2004-300015
Aug. 5, 2005   (JP)  ............... 2005-228738

(51) Int. Cl.
   *G09G 3/36*    (2006.01)
(52) U.S. Cl. ............... 345/102; 345/212; 345/207; 345/82; 345/204; 363/21.12; 363/21.11; 363/21.1
(58) Field of Classification Search ............... 345/102, 345/82, 212, 207, 204, 214, 211; 363/21.12, 363/21.11, 21.1, 21.9, 21.7; 315/247, 246, 315/291, 307
   See application file for complete search history.

(56) References Cited

U.S. PATENT DOCUMENTS

| | | | |
|---|---|---|---|
| 6,734,639 B2 * | 5/2004 | Chang et al. | ............... 315/291 |
| 6,844,760 B2 * | 1/2005 | Koharagi et al. | ........... 327/110 |
| 6,909,249 B2 * | 6/2005 | Otake | ........................ 315/291 |
| 2003/0117422 A1 | 6/2003 | Hiyama et al. | |
| 2003/0214242 A1 | 11/2003 | Berg-johansen | |
| 2004/0105283 A1 | 6/2004 | Schie et al. | |

FOREIGN PATENT DOCUMENTS

| | | |
|---|---|---|
| JP | 2001-272938 A | 10/2001 |
| WO | WO-03/017729 A1 | 2/2003 |
| WO | WO-2004/060023 A1 | 7/2004 |

* cited by examiner

*Primary Examiner*—Tuyet Vo
(74) *Attorney, Agent, or Firm*—Lerner, David, Littenberg, Krumholz & Mentlik, LLP

(57) ABSTRACT

A light emitting element drive circuit and a display system able to simultaneously perform constant current control and PWM control and able to perform a stable adjustment of luminance over a wide dynamic range, including a constant voltage source having an output voltage adjustment unit able to be changed in output voltage according to a signal from the outside, a switch circuit connected to the cathode side of the LED and ON/OFF controlled in accordance with a PWM signal from the outside, a current detection unit for detecting the current flowing in the circuit, and a sample and hold circuit for maintaining the current input value from the current detection unit for a constant period, and the output voltage adjustment unit receives as input the output of the sample and hold circuit, that is, the current value when the switch circuit is ON, and adjusts the output of the constant voltage source so that this value becomes a previously determined set value, to thereby make the current flowing in the LED constant.

8 Claims, 11 Drawing Sheets

FIG. 6A PWM SIGNAL

FIG. 6B $I_{LED}$ (CURRENT DETECTION OUTPUT)

(CONSTANT VOLTAGE REFERENCE VOLTAGE)

LIGHT EMITTING ELEMENT DRIVE DEVICE AND DISPLAY APPARATUS

CROSS-REFERENCE TO RELATED APPLICATIONS

The present invention contains subject matter related to Japanese Patent Application No. 2004-300015 filed in the Japan Patent Office on Oct. 14, 2004, and Japanese Patent Application No. 2005-228738 filed in the Japan Patent Office on Aug. 5, 2005, the entire contents of which being incorporated herein by reference.

BACKGROUND OF THE INVENTION

The present invention relates to a drive device for a light emitting diode (LED) or other light emitting element emitting light with a luminance in accordance with a flow of current and a display system having for example a non-light emitting transmission type display device using the same.

The mainstream of backlights of liquid crystal panels is the cold cathode fluorescent lamp (CCFL) type using a fluorescent lamp, but a mercury-less type has been demanded for protection of the environment. Due to this, in recent years, LEDs have been looked at as promising light sources to take the place of CCFLs. In particular, the method of individually using primary colors of red LEDs, green LED, and blue LEDs and optically combining them to obtain a white color enables easy balance of color, therefore use for the purpose of television is being actively studied.

An LED basically has the characteristic of changing in luminance in accordance with the current. Further, the forward direction voltage fluctuates due to individual differences and temperature. Accordingly, when using LEDs for the backlight of a liquid crystal panel (LCD etc.), a constant current characteristic is sought for the drive devices in order to ensure a constant, uniform luminance.

Simply speaking, as shown in FIG. 1, the method of limiting the current by connecting each LED 2 in series with a resistor 3 to an output of a constant voltage source 1 is known. In the system of FIG. 1, however, with a high luminance LED through which a large current is passed, the loss due to this resistor 3 becomes an issue.

As a method for dealing with this, as shown in FIG. 2, there is the method of using a constant current source 4 as the drive device. In this drive device, adjustment of the luminance of the LED 2 is possible by reducing the current value. The current value is generally changed by inserting a resistor 5 in series to the LED 2, detecting the current value by the potential difference across the ends, applying feedback control, and controlling the current value to a target value. However, the smaller the current, the smaller the potential difference, so the worse the luminance and the greater the susceptability to noise etc. Further, when the resistance value is made large enough that a sufficient voltage is obtained even with a small current, there is the disadvantage that the loss becomes large at the time of a large current.

Therefore, in order to stably adjust the luminance in a wide dynamic range, there is known a drive device employing the PWM control system of turning ON/OFF the current flowing in the LED at a constant timing and adjusting the luminance according to a ratio of that ON/OFF period. As one of methods accomplishing this method, as shown in FIG. 3, a method of inserting a switch element 6 in series to the LED 2 and turning it ON/OFF at a certain determined timing is employed (see for example Japanese Patent Publication (A) No. 2001-272938).

However, when using a constant current source as a drive device employing the PWM control system, it is attempted to create a constant flow of current at a constant current source irrespective of the fact that the current does not flow in the OFF period, therefore the control becomes abnormal and there is the apprehension that correct constant current control can no longer be carried out. As a result, there is the disadvantage that stable adjustment of the luminance adjustment is not possible.

SUMMARY OF THE INVENTION

An object of the present invention is to provide a light emitting element drive circuit and a display system able to simultaneously perform constant current control and PWM control and able to perform stable adjustment of the luminance in a wide dynamic range.

According to a first aspect of the present invention, there is provided a light emitting element drive device comprising a light emitting unit including at least one light emitting element emitting light with a luminance in accordance with a flow of current; a constant voltage source able to be adjusted in output voltage and supplying the output voltage to the light emitting element of the light emitting unit; a switch means turning ON/OFF the output of the constant voltage source at a predetermined timing and adjusting the light emission luminance of the light emitting element according to a ratio of the ON/OFF states; a current detecting means for detecting the value of a current flowing in the light emitting element; a sample and hold means for holding the value of the output of the current detecting means when the switch means is ON; and a controlling means for adjusting the output voltage of the constant voltage source so that the output value of the sample and hold means becomes a predetermined value.

According to a second aspect of the present invention, there is provided a display apparatus comprising a non-light emitting transmission type display unit; an illumination unit having a light emitting element provided on a back surface of the display unit and including at least one light emitting element emitting light with a luminance in accordance with a flow of current; and a light emitting element drive device for driving the light emitting element in the light emitting unit, wherein the light emitting element drive device includes a constant voltage source able to be adjusted in output voltage and supplying the output voltage to the light emitting element of the light emitting unit; a switch means turning ON/OFF the output of the constant voltage source at a predetermined timing and adjusting the light emission luminance of the light emitting element according to a ratio of the ON/OFF states; a current detecting means for detecting the value of a current flowing in the light emitting element; a sample and hold means for holding the value of the output of the current detecting means when the switch means is ON; and a controlling means for adjusting the output voltage of the constant voltage source so that the output value of the sample and hold means becomes a predetermined value.

Preferably, the controlling means has a constant current use reference voltage source, a constant current control use error amplifier for comparing the output of the sample and hold means and the constant current use reference voltage from the constant current use reference voltage source, a constant voltage use reference voltage source for changing the constant voltage use reference voltage in accordance with the output of the constant current control use error amplifier and outputting the same, and a constant voltage control use error amplifier for comparing the output voltage of the constant voltage source and the constant voltage use reference voltage from the constant voltage use reference voltage source, and the output of the constant voltage source is controlled so as to become a value determined by the constant voltage use reference voltage in accordance with a result of comparison of the constant voltage control use error amplifier.

Preferably, provision is further made of a means able to adjust the luminance of the light emitting element by changing the current value when the switch means is ON.

Preferably, the constant current use reference voltage source can change the value of the constant current use reference voltage output by an external signal and can adjust the luminance of the light emitting element by changing the current value when the switch means is ON.

Preferably, the switch means includes a transistor which is connected in series to the light emitting unit with respect to a voltage output line of the constant voltage source and having a control terminal to which a PWM signal in accordance with the ratio of ON/OFF states is supplied.

Preferably, the constant voltage source includes a switching regulator, and the transistor is connected between a negative electrode of the switching regulator and the light emitting unit or between a positive electrode and the light emitting unit.

Preferably, the current detecting means includes a resistor element connected between the light emitting unit and the negative electrode of the switching regulator and detects the current according to the potential difference across the resistor element.

Preferably, the sample and hold means includes a peak hold circuit for holding a peak value of the current detection value for a constant period.

According to the present invention, the constant voltage source outputs the voltage, and the switch means turns ON/OFF the output of the constant voltage source at a predetermined timing. When the switch means turns it ON/OFF, for example a square wave current flows through the light emitting element, and the light emitting element is turned on. At this time, the current flowing in the light emitting element is detected by the current detecting means, and the detection result is supplied to the sample and hold means. In the sample and hold means, only the value when the switch means is ON is input to the controlling means. Then, by the controlling means, the output voltage is stably controlled so that the current flowing in the light emitting element when the switch means is ON becomes the same value as the previously determined set value.

According to the present invention, simultaneous constant voltage control and PWM control becomes possible, and stable adjustment of luminance in a wide dynamic range becomes possible. Further, by making the current value when controlling the constant current variable, adjustment of the luminance in a further broader dynamic range becomes possible. Further, a current restricting resistor is not used for the control of the constant current, and a resistor having a low resistance can be used as the current detection resistor, therefore highly efficient drive of an LED becomes possible.

BRIEF DESCRIPTION OF THE DRAWINGS

These and other objects and features of the present invention will become clearer from the following description of the preferred embodiments given with reference to the attached drawings, wherein.

DETAILED DESCRIPTION

Below, an explanation will be given of embodiments of the present invention with reference to the drawings.

In the present embodiment, a light emitting diode (LED) is employed as a light emitting element changing in luminance according to the flow of current being driven.

FIRST EMBODIMENT

Figure 4:
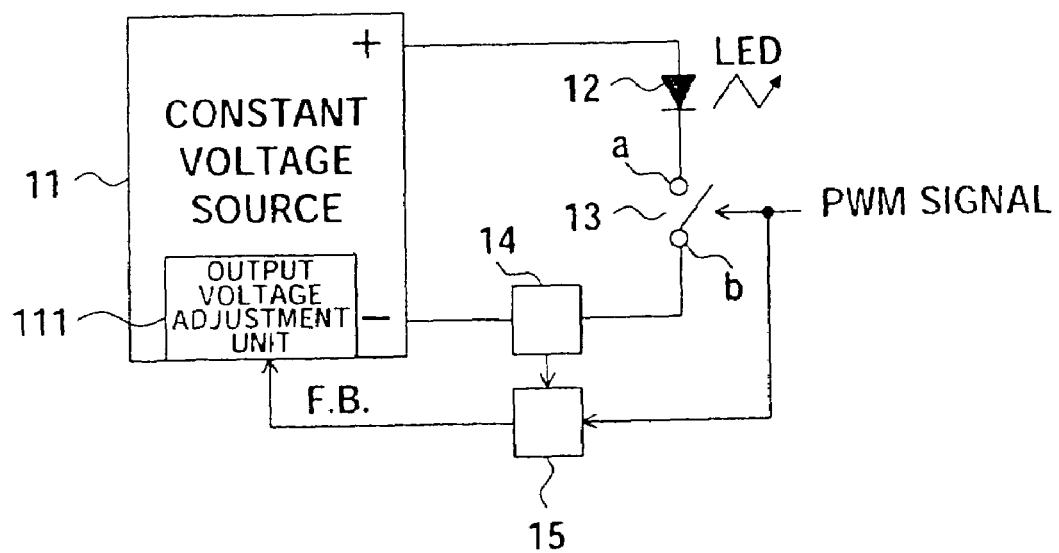
FIG. 4 is a circuit diagram of a light emitting element (LED) drive device according to a first embodiment of the present invention.

FIG. 4 is a circuit diagram of a light emitting element (LED) drive device according to a first embodiment of the present invention.

An LED drive device 10 of FIG. 4 has a constant voltage source 11, an LED 12, a switch means constituted by a switch circuit 13, a current detection unit 14, and a sample and hold circuit 15.

The constant voltage source 11 has a controlling means constituted by an output voltage adjustment unit 111 and can be changed in output voltage by a signal from the outside. The output voltage adjustment unit 111 receives as input the output of the sample and hold circuit 15, that is, the current value when the switch circuit 13 is ON. The output of the constant voltage source 11 is adjusted so that this value becomes a previously determined set value. Specifically, the output voltage adjustment unit 111 acts in a direction to raise the voltage when the current value is smaller than the set value and in a direction lowering the voltage when the current value is larger than the set value. A positive (+) terminal of the constant voltage source 11 is connected to an anode of the LED 12.

The switch circuit 13 is connected at its movable contact a to a cathode of the LED 12 and connected at its fixed contact c to the input of the current detection unit 14 and ON/OFF controlled in accordance with a PWM signal from the outside.

The current detection unit 14 detects the current flowing in the circuit and supplies the detected current value to one terminal of the constant voltage source 11 and the sample and hold circuit 15.

The sample and hold circuit 15 holds the current input value from the current detection unit 14 for a constant period. The sample and hold circuit 15 also receives as input the PWM signal input to the switch circuit 13 and is configured so as to hold the and continuously output the input value of the time when this PWM signal is ON even when the PWM signal is OFF.

In such a configuration, when the constant voltage source 11 outputs the voltage and the switch circuit 13 turns ON/OFF by the PWM signal, a square wave current flows in the LED 12, and the LED 12 is turned on. At this time, the current flowing in the LED 12 is detected by the current detection unit 14, and the detection result is supplied to the sample and hold circuit 15. In the sample and hold circuit 15, only the value when the PWM signal is ON is input to the output voltage adjustment unit 111 of the constant voltage source 11. As a result, the output voltage is stably controlled so that the current flowing in the LED 12 when the PWM signal is ON becomes the same value as the previously determined set value.

As explained above, according to the present first embodiment, provision is made of a constant voltage source 11 having an output voltage adjustment unit 111 and able to be changed in output voltage according to a signal from the outside, a switch circuit 13 connected to the cathode side of the LED and ON/OFF controlled in accordance with a PWM signal from the outside, a current detection unit 14 for detecting the current flowing in the circuit, and a sample and hold circuit 15 for holding the current input value from the current detection unit 14 for a constant period, and the output voltage adjustment unit 111 receives as input the output of the sample and hold circuit 15, that is, the current value when the switch circuit 13 is ON, and adjusts the output of the constant voltage source 11 so that this value becomes a previously determined set value, therefore there are the advantages that the PWM control and the constant current control are simultaneously carried out and stable adjustment of luminance in a wide dynamic range becomes possible.

Further, a current restricting resistor is not used for the constant current control. A resistor having a low resistance can also be used as the current detection resistor, therefore highly efficient drive of the LED becomes possible.

Figure 1:
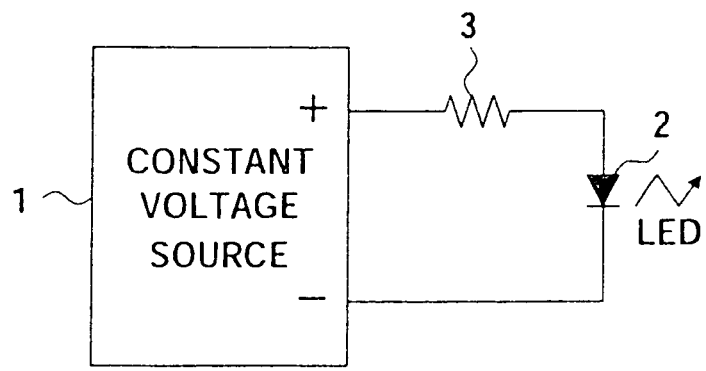
FIG. 1 is a view for explaining a light emitting diode (LED) drive device of a first related art.
Figure 2:
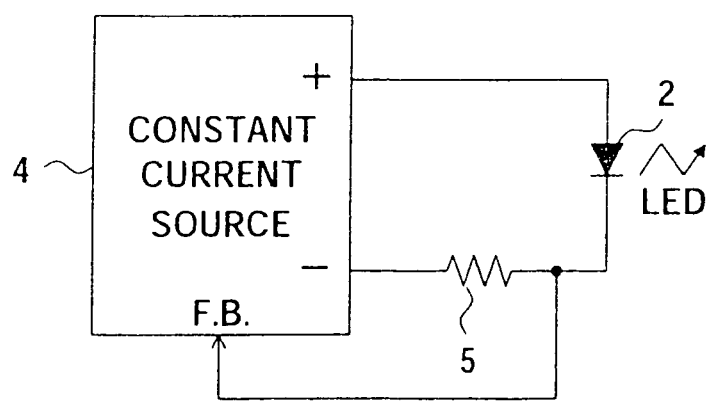
FIG. 2 is a view for explaining a light emitting diode (LED) drive device of a second related art.
Figure 3:
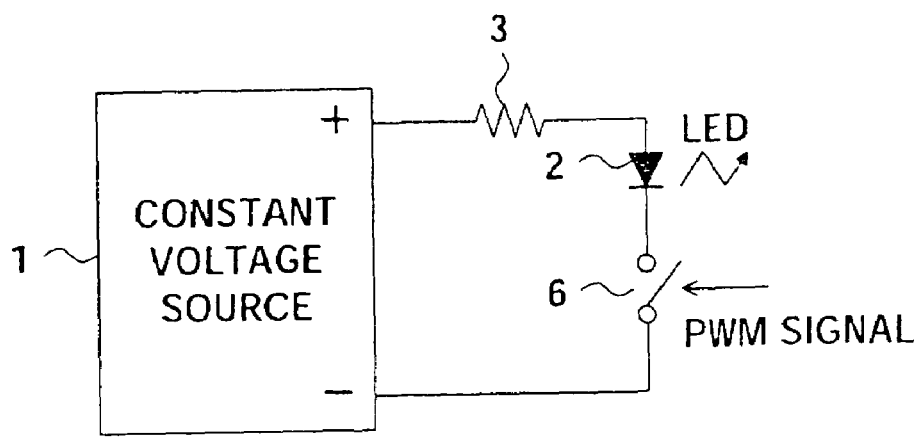
FIG. 3 is a view for explaining a light emitting diode (LED) drive device of a third related art.

For example, contrary to the fact that the current restricting resistor in the drive device of FIG. 3 explained as the related art has a resistance value of for example on hundred ohms ($\Omega$) to several hundreds ohms ($\Omega$), the resistance value of the current detection resistor in the LED drive device of FIG. 4 according to the present embodiment is for example 1 ohms ($\Omega$) or less. The current flowing through them is for example 500 mA. Accordingly, the powers consumed in the drive device of FIG. 3 and the drive device of FIG. 4 become 50 W versus 0.5 W. In the LED drive device according to the present embodiment, a great reduction of the power consumption can be achieved, and efficient LED drive becomes possible.

Further, for the PWM control, for example in a signal processing circuit of a display system to which the LED drive device according to the present embodiment is applied, the PWM control is carried out by control based on adjustment of the brightness by the user, by control based on the average luminance (APL), and by control for adjustment of the white balance of the red (R), green (G), and blue (B) LEDs. A PWM signal based on this is supplied to the switch circuit 13 and the sample and hold circuit 15.

SECOND EMBODIMENT

Figure 5:
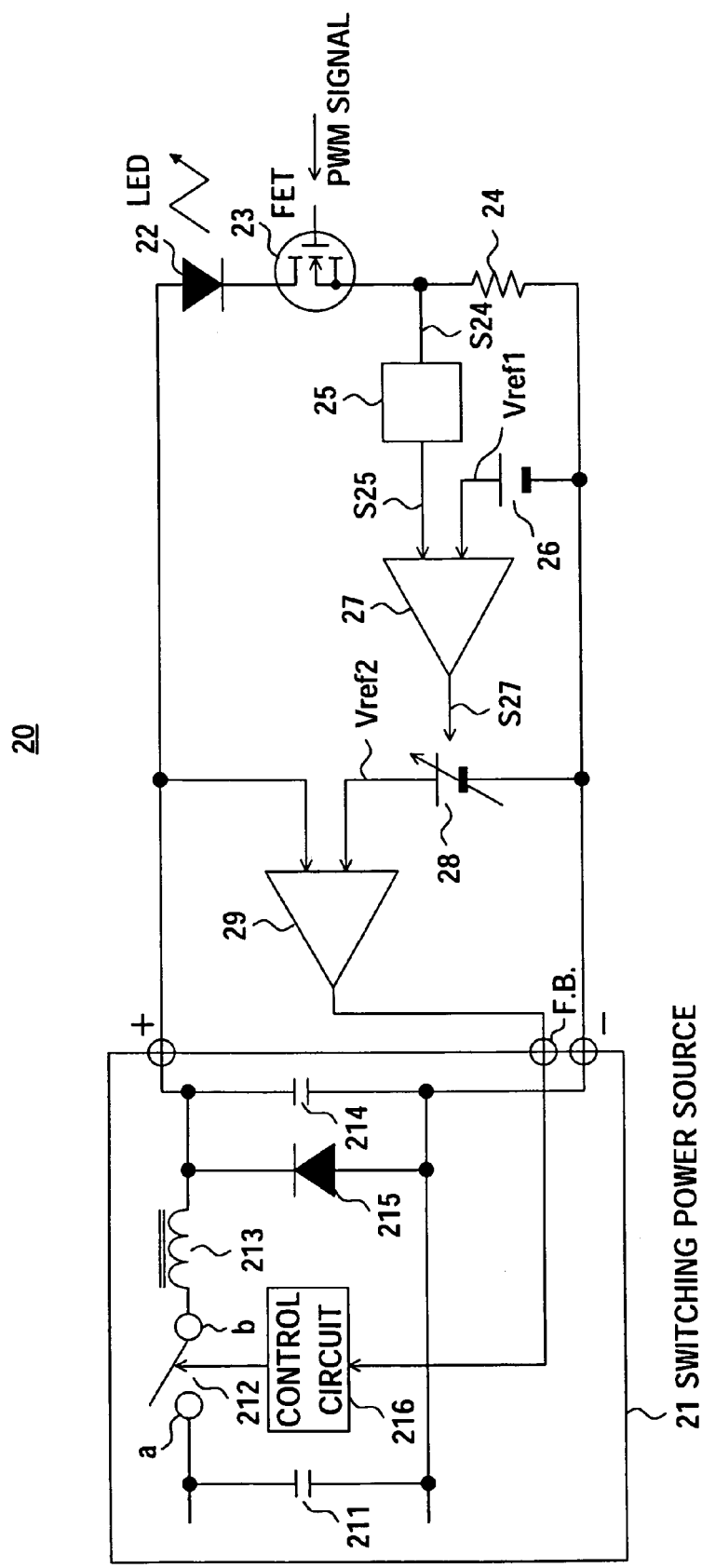
FIG. 5 is a circuit diagram of a light emitting element (LED) drive device according to a second embodiment of the present invention.

FIG. 5 is a circuit diagram of a light emitting element (LED) drive device according to a second embodiment of the present invention.

The LED drive device 20 of FIG. 5 is configured as a more specific version of the LED drive device of FIG. 4. Specifically, this is an embodiment using a boostdown chopper type switching power source (switching regulator) 21 as the constant voltage source, an n-channel insulating gate type field effect transistor (MOS-FET: hereinafter simply referred to as an "FET") 23 as the switch circuit, a resistor 24 as the current detection unit, a peak hold circuit 25 as the sample and hold circuit, a constant current use reference voltage source 26 as the control unit (including the output voltage adjustment unit), a constant current control use error amplifier 27, a constant voltage use reference voltage source 28 having a function making the output voltage variable from the outside, and a constant voltage control use error amplifier 29.

The switching power source 21, as shown in FIG. 5, has an input capacitor 211, a switch element 212, a choke coil 213, an output capacitor 214, a diode 215, and a control circuit 216.

A first electrode of the input capacitor 211, a first electrode of the output capacitor 214, and the anode of the diode 215 are connected to one common terminal. The movable contact a of the switch element 212 is connected to a second electrode of the input capacitor 211, and the fixed contact b is connected to one end of the choke coil 213. The other end of the choke coil 213 is connected to the cathode of the diode 215, the second electrode 214 of the output capacitor 214, and the positive (+) terminal.

The control circuit 216 receives as feedback the output of the constant voltage control use error amplifier 29. By ON/OFF control of the switch element 212 based on this signal, the output voltage is changed and the output voltage is controlled so as to become the value determined by the constant voltage use reference voltage source 28.

A drain of the FET 23 is connected to the cathode of the LED 22, and the source is connected to one end of the current detection resistor 24 and the input of the peak hold circuit 25. The other end of the current detection resistor 24, the negative electrode of the constant current use reference voltage source 26, and the negative electrode of the constant voltage use reference voltage source 28 are commonly connected to the negative (−) terminal of the switching power source 21.

The peak hold circuit 25 outputs the peak value of the input voltage value to the constant current control use error amplifier 27 for the period of the previously determined PWM cycle.

The constant current control use error amplifier 27 compares an output S25 of the peak hold circuit 25 and an output reference voltage Vref1 of the constant current use reference voltage source 26 and supplies the result as a signal S27 to the constant voltage use reference voltage source 28. Specifically, the constant current control use error amplifier 27 is configured so as to act in a direction raising an output reference voltage Vref2 of the constant voltage use reference voltage source 28 when the output signal S25 of the peak hold circuit 25 is smaller than the output reference voltage Vref1 of the constant current use reference voltage source 26 and act in a direction lowering the output reference voltage Vref2 of the constant voltage use reference voltage source 28 when the output signal S25 of the peak hold circuit 25 is larger than the output reference voltage Vref1 of the constant current use reference voltage source 26.

The constant voltage use reference voltage source 28 is a variable voltage source and supplies a reference voltage Vref2 in accordance with the output signal S27 of the constant current control use error amplifier 27 to the constant voltage control use error amplifier 29.

The constant voltage control use error amplifier 29 compares the voltage of the + output of the switching power source 21 and the output reference voltage Vref2 of the constant voltage use reference voltage source 28, feeds back the result to the control circuit 216 of the switching power source 21, and controls the ON/OFF state of the switch element 212 of the switching power source 21 to thereby change the output voltage thereof to control the output voltage so as to become the value determined by the constant voltage use reference voltage source 28.

Figure 6C:
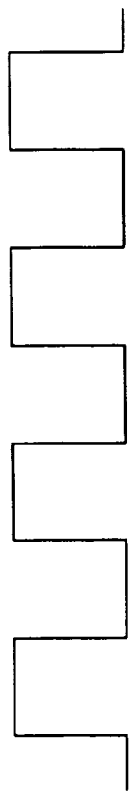
FIG. 6 is a waveform diagram of principal parts of the LED drive device of FIG. 5.
Figure 6C:
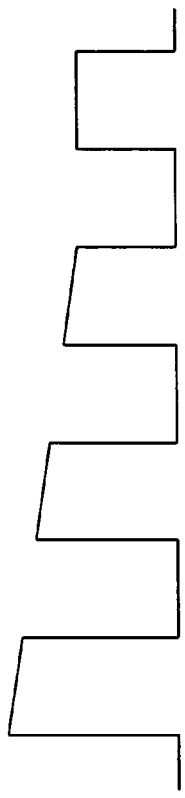
Figure 6C:
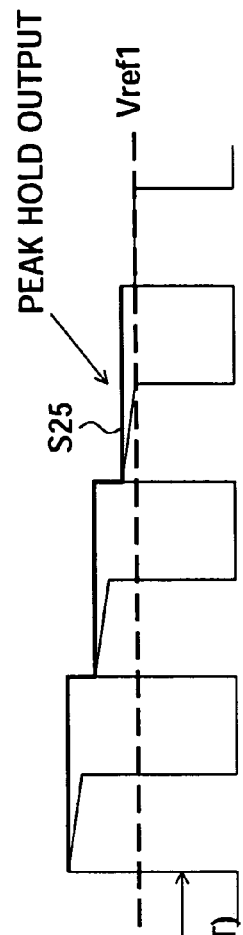
Figure 6D:
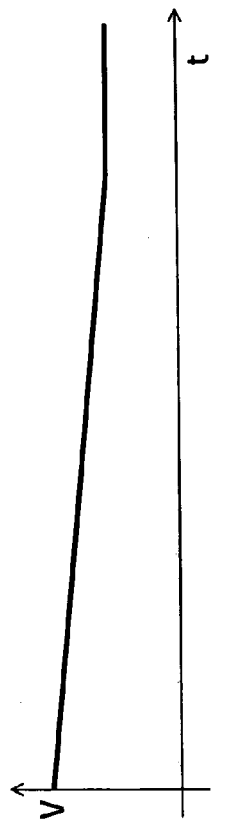

Next, an explanation will be given of the operation according to the above configuration with reference to the waveform diagrams of FIGS. 6A to 6D. FIG. 6A shows the PWM signal, FIG. 6B shows a LED current ILED flowing in the LED 23, FIG. 6C shows a current detection output S24 of the current detection resistor 24, and FIG. 6D shows the reference voltage Vref2 from the constant voltage use reference voltage source 28.

When the switching power source 21 outputs voltage and the FET 23 is turned ON/OFF by the PWM signal as shown in FIG. 6A, the LED 22 carries a square wave current as shown in FIG. 6B, and the LED 22 is turned on. At this time, the current flowing in the LED 22 is detected by the current detection resistor 24, and the voltage of the terminal on the side to which the FET 23 is connected is input as the signal S24 to the peak hold circuit 25. The peak hold circuit 25 holds the peak value of the input voltage thereof for a period of the PWM cycle, therefore the output of the peak hold circuit 25 becomes equal to the value of the current flowing in the LED 22 when the PWM signal is ON. The output of the peak hold circuit 25 is input to the constant current control use error amplifier 27.

The constant current control use error amplifier 27 compares the output S25 of the peak hold circuit 25 and the output reference voltage Vref1 of the constant current use reference voltage source 26 and supplies the result of the comparison via the F. B. terminal to the constant voltage use reference voltage source 28 as the signal S27. The constant voltage use reference voltage source 28 changes the output reference voltage Vref2 in accordance with the output signal S27 of the constant current control use error amplifier 27. The constant voltage control use error amplifier 29 compares the output reference voltage Vref2 of the constant voltage use reference voltage source 28 and the output voltage of the switching power source 21 and feeds back the result of the comparison to the control circuit 216 of the switching power source 21. The control circuit 216 performs the ON/OFF control of the switch element 212 so that the output voltage of the switching power source 21 becomes the value determined by the constant voltage use reference voltage source 28. As a result, when the PWM signal is ON, the current flowing in the LED 22 is stably controlled to the value previously determined by the constant current use reference voltage source 26 and the current detection resistor 24, and the PWM control and the constant current control are simultaneously carried out. As a result, stable adjustment of the luminance becomes possible in a wide dynamic range.

Note that the constant current use reference voltage source 26 is not limited to the configuration of FIG. 5 and can be configured for example so as to be able to adjust the value of the reference voltage Vref1 by external operation. It can configured so as to be able to change the current value when the FET 23 is ON and thereby change the value of the current flowing in the LED 22 and adjust the light emission luminance of the LED 22.

Figure 7:
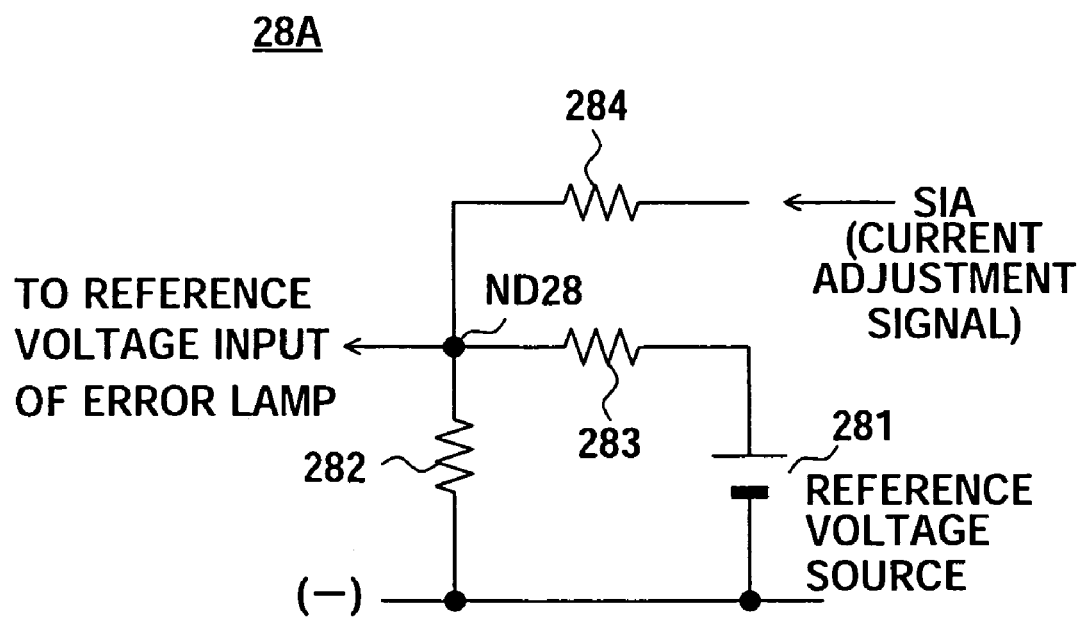
FIG. 7 is a circuit diagram of an example of the configuration of a constant voltage use reference voltage source provided with an adjustment function.

FIG. 7 is a circuit diagram of an example of the configuration of a constant voltage use reference voltage source provided with the adjustment function.

This constant voltage use reference voltage source 28A, as shown in FIG. 7, has a reference voltage source 281 and resistors 282 to 284. The negative electrode of the reference voltage source 281 and one end of the resistor 282 are connected to one terminal of the switching power source 21, and the positive electrode of the reference voltage source 281 is connected to one end of the resistor 283. The other ends of the resistors 282 and 283 are connected to each other and thus a node ND 28 is configured. Further, one end of the resistor 284 is connected to the node ND 28, and the other end of the resistor 284 is connected to an input line of a current adjustment signal SIA from the outside.

The thus configured constant voltage use reference voltage source 28A adjusts the output voltage of the reference voltage source 281 to a desired value in accordance with the external current adjustment signal SIA and supplies the reference voltage Vref1 having the desired value to the constant voltage control use error amplifier 29 from the node ND 28. In this way, the constant voltage use reference voltage source 28A of FIG. 7 can adjust the output reference voltage Vref2 by the current adjustment signal SIA from the outside, therefore when the PWM signal is ON, the current flowing in the LED 22 is stably controlled to the value previously determined by the adjusted reference voltage Vref2 of the constant voltage use reference voltage source 28 and the current detection resistor 24, and the PWM control and the constant current control are simultaneously carried out.

Namely, it is possible to adjust the output reference voltage Vref2 of the constant voltage use reference voltage source 28A to a desired value by the current adjustment signal SIA from the outside so as to adjust the value of the current flowing in the LED 22. As a result, the light emission luminance of the LED 22 can be adjusted. Accordingly, adjustment of the luminance in a further broader dynamic range becomes possible.

Note that, by employing the same configuration as that of the constant voltage use reference voltage source 28A explained related to FIG. 7 as the constant current use reference voltage source 26, it is possible to configure the same so that the value of the reference voltage Vref1 of the constant current use reference voltage source 26 can be adjusted.

Further, in the above embodiment, use was made of the n-channel MOS-FET as the switch means in the line between the negative (−) terminal of the switching power source 21 and the cathode of the LED 22, but it is also possible to replace it with for example an npn type bipolar transistor. Further, when using a p-channel MOS-FET in place of the n-channel MOS-FET, it is connected between the positive (+) terminal of the switching power source 21 and the anode of the LED 22. In this case as well, it is also possible to replace this with a pnp type bipolar transistor.

THIRD EMBODIMENT

Figure 8:
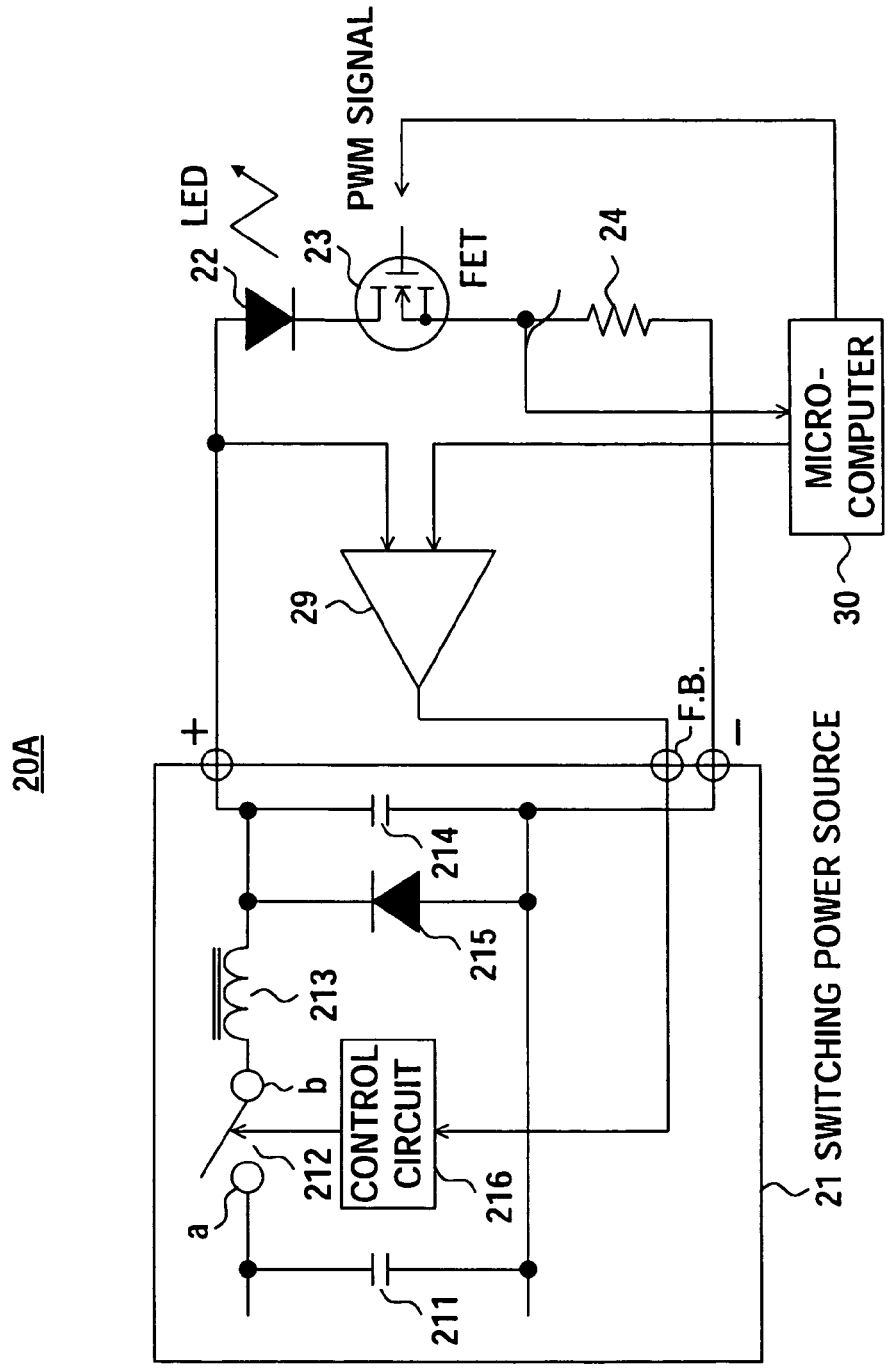
FIG. 8 is a circuit diagram of a light emitting element (LED) drive device according to a third embodiment of the present invention.

FIG. 8 is a circuit diagram showing a light emitting element (LED) drive device according to a third embodiment of the present invention.

A LED drive device 20A of the present third embodiment is an example replacing the peak hold circuit 25, the constant current control use error amplifier 27, the constant current use reference voltage source 26, and the constant voltage use reference voltage source 28 of the second embodiment shown in FIG. 5 with a microcomputer 30. Further, in the third embodiment, the PWM signal is output from the same microcomputer.

In this case, the voltage detected by the current detection resistor 24 is input to the microcomputer 30. The microcomputer 30 converts the voltage from an analog to digital format at a not shown analog/digital converter, samples and holds it matching with the PWM signal generated by the microcomputer 30 per se, compares it with the current set value previously determined by software, converts the output in accordance with the result to an analog value through a not shown digital/analog converter, and outputs the same to the constant voltage control use error amplifier 29 to thereby make operation the same as that in the second embodiment of FIG. 6 possible. Furthermore, by changing the current set value by software, adjustment of the luminance in a further broader dynamic range than that in the case by only PWM control becomes possible.

FOURTH EMBODIMENT

Figure 9:
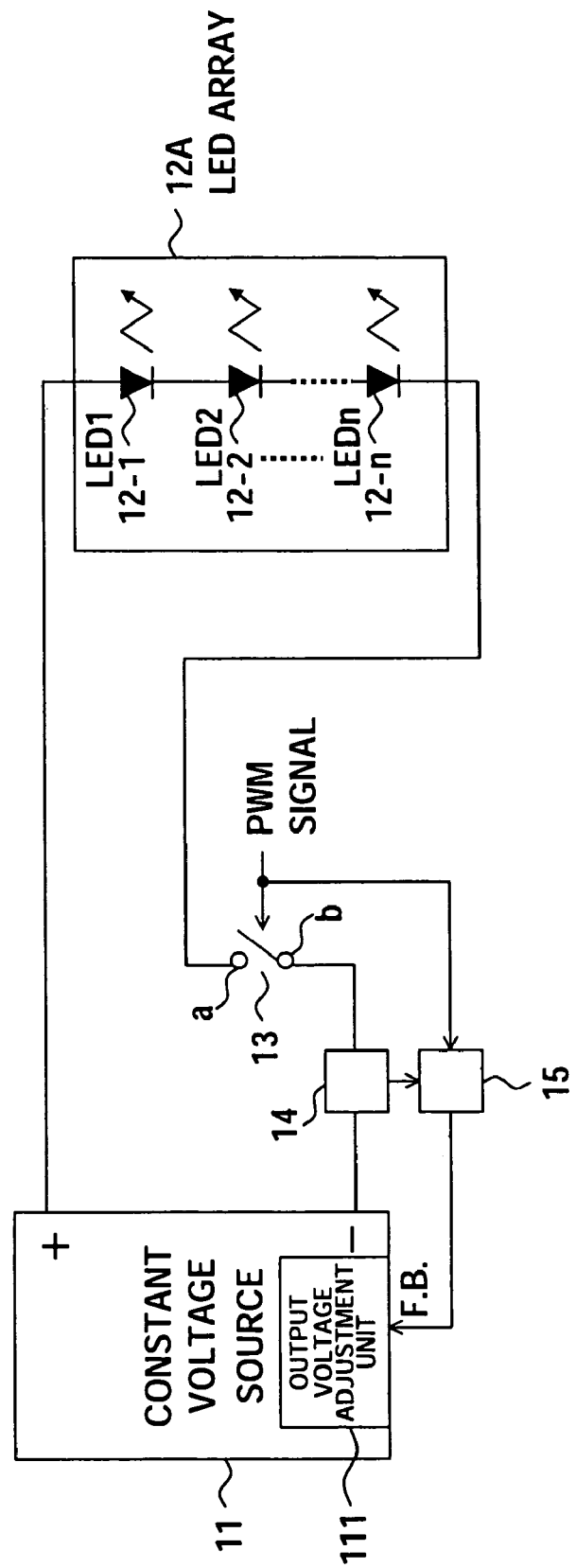
FIG. 9 is a circuit diagram of a light emitting element (LED) drive device according to a fourth embodiment of the present invention.

FIG. 9 is a circuit diagram of a light emitting element (LED) drive device according to a fourth embodiment of the present invention. The LED drive device 10A of the present fourth embodiment is an example obtained by replacing the LED 12 of the LED drive device 10 of the first embodiment shown in FIG. 4 by an LED array 12A.

The LED array 12A is obtained by connecting a plurality of LEDs in series. The applied voltage becomes larger by that amount. For example, in the case of an LED array 12A comprised of n number of LEDs 12-1 to 12-n connected in series, n times the voltage becomes necessary, therefore a constant voltage source 11 and a switch circuit 13 having an output voltage and shield voltage in accordance with the voltage become necessary, but when this condition is satisfied, the same operation becomes possible by the same configuration as that of the LED drive device 10 of FIG. 4.

For example, when using the LEDs as the light source of the backlight of a liquid crystal panel, from the viewpoint of realistic cost, the LEDs cannot be individually driven one by one. For this reason, when using the LEDs as the light source with a back line, the method of connecting a certain number of LEDs in series and driving them all together is employed. Accordingly, the LED drive device 10A of FIG. 9 is preferred for a transmission type liquid crystal display system having a backlight device.

FIFTH EMBODIMENT

Figure 10:
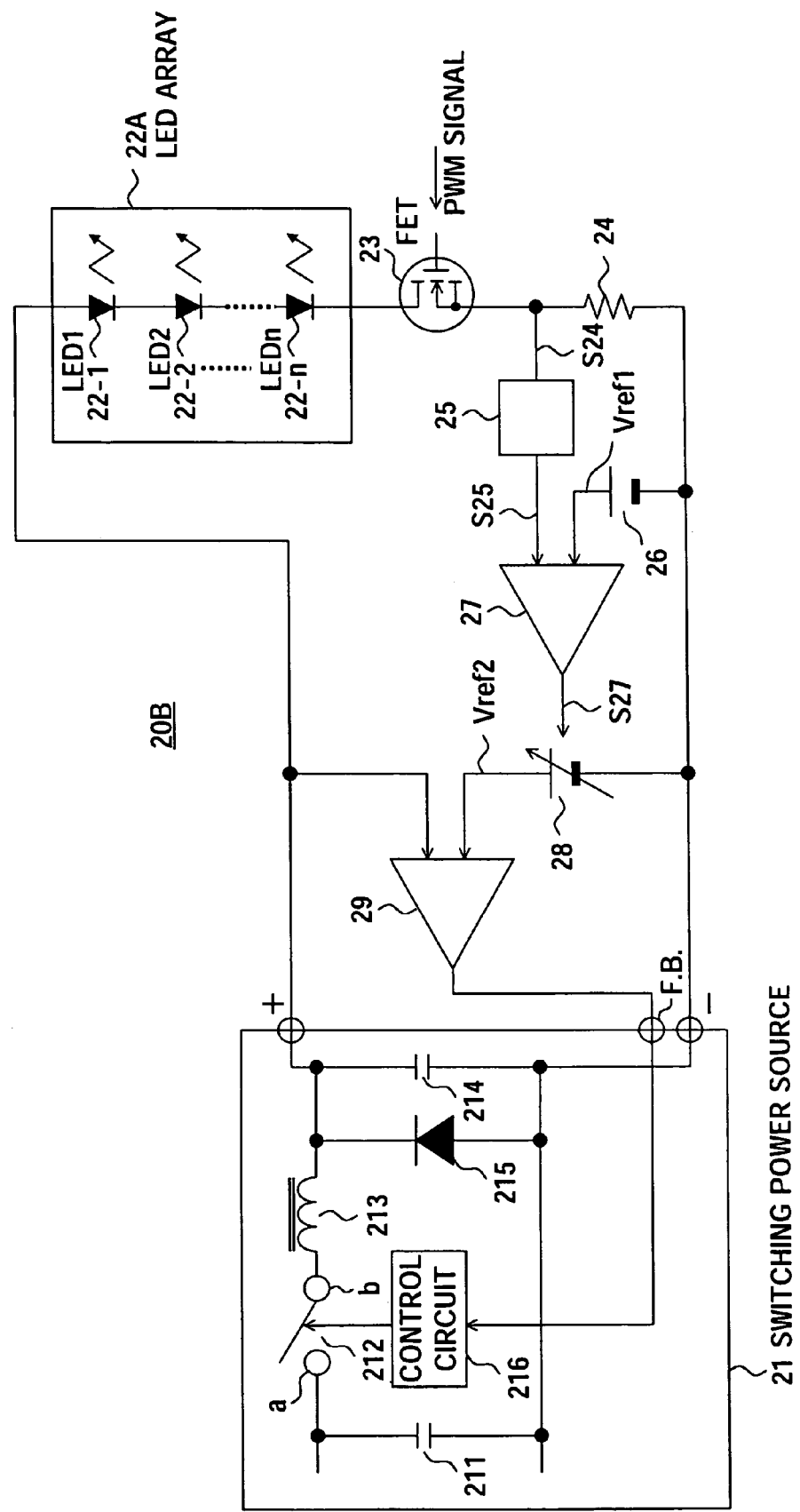
FIG. 10 is a circuit diagram of a light emitting element (LED) drive device according to a fifth embodiment of the present invention.

FIG. 10 is a circuit diagram of a light emitting element (LED) drive device according to a fifth embodiment of the present invention. An LED drive device 20B of the present fifth embodiment is an example obtained by replacing the LED 22 of the LED drive device 20 of the second embodiment shown in FIG. 5 by an LED array 22A.

The LED array 22A is obtained by connecting a plurality of LEDs in series. The supplied voltage becomes larger by that amount. For example, in the case of an LED array 22A obtained by connecting n number of LEDs 22-1 to 22-n in series, n times the voltage becomes necessary, therefore a constant voltage source 21 and a switch circuit 23 having an output voltage and shield voltage in accordance with the voltage become necessary, but when this condition is satisfied, the same operation becomes possible by the same configuration as that of the LED drive device 20 of FIG. 5.

The LED drive device 20B of FIG. 10 is preferred for a transmission type liquid crystal display system having a backlight device.

SIXTH EMBODIMENT

Figure 11:
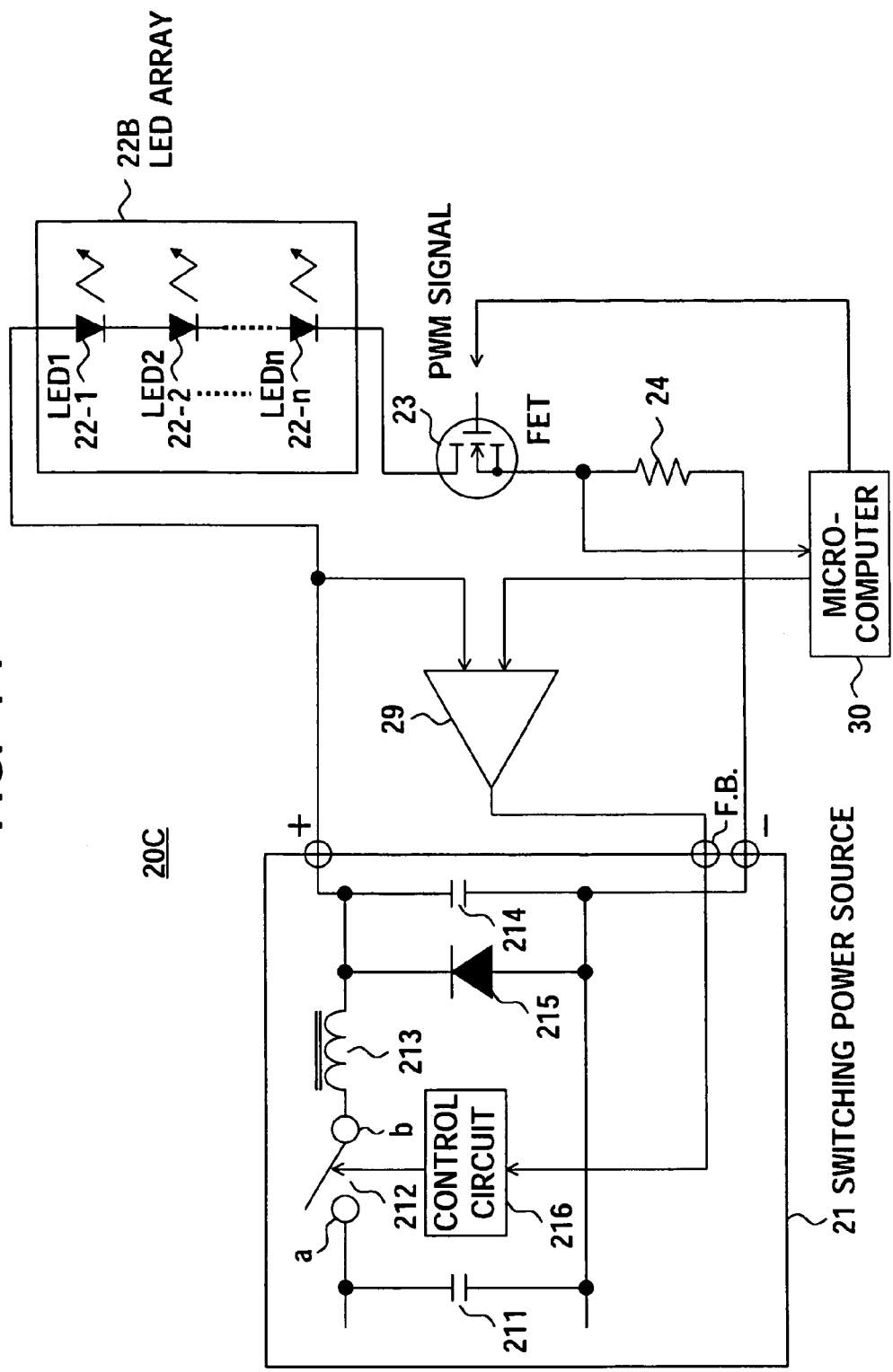
FIG. 11 is a circuit diagram of a light emitting element (LED) drive device according to a sixth embodiment of the present invention.

FIG. 11 is a circuit diagram of a light emitting element (LED) drive device according to a sixth embodiment of the present invention.

A LED drive device 20C of the present sixth embodiment is an example obtained by replacing the LED 22 of the LED drive device 20A of the third embodiment shown in FIG. 8 by an LED array 22C.

The LED array 22C is obtained by connecting a plurality of LEDs in series. The supplied voltage becomes larger by that amount. For example, in the case of an LED array 22C obtained by connecting n number of LEDs 22-1 to 22-n in series, n times the voltage becomes necessary, therefore a constant voltage source 21 and a switch circuit 23 having an output voltage and shield voltage in accordance with the voltage become necessary, but when this condition is satisfied, the same operation becomes possible by the same configuration as that of the LED drive device 20 of FIG. 5.

The LED drive device 20C of FIG. 11 is preferred for a transmission type liquid crystal display system having a backlight device.

SEVENTH EMBODIMENT

Below, an explanation will be given of a liquid crystal display system using an LED backlight to which the LED drive devices of FIG. 9 to FIG. 11 can be applied as the seventh embodiment of the present invention.

Figure 12:
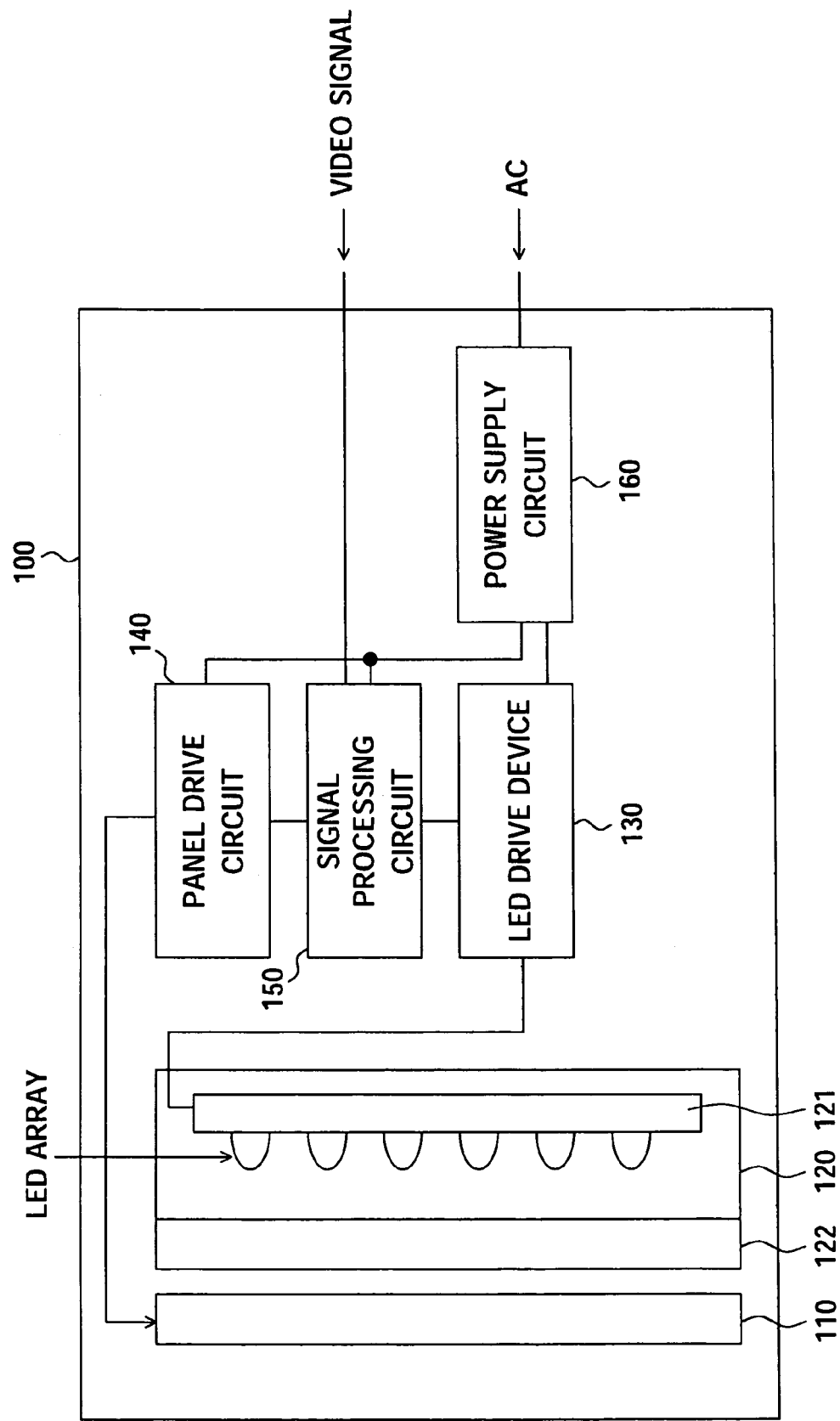
FIG. 12 is a block diagram of a light emitting element (LED) drive device according to a seventh embodiment of the present invention.

FIG. 12 is a block diagram of an example of the configuration of the liquid crystal display system of the seventh embodiment according to the present invention.

The liquid crystal display system 100, as shown in FIG. 12, has a transmission type liquid crystal display panel (LCD panel) 110, a backlight device 120 as the illumination unit provided on the back surface of the LCD panel 110, an LED drive device 130, a panel drive circuit 140, a signal processing circuit 150, and a power supply circuit 160.

Figure 13:
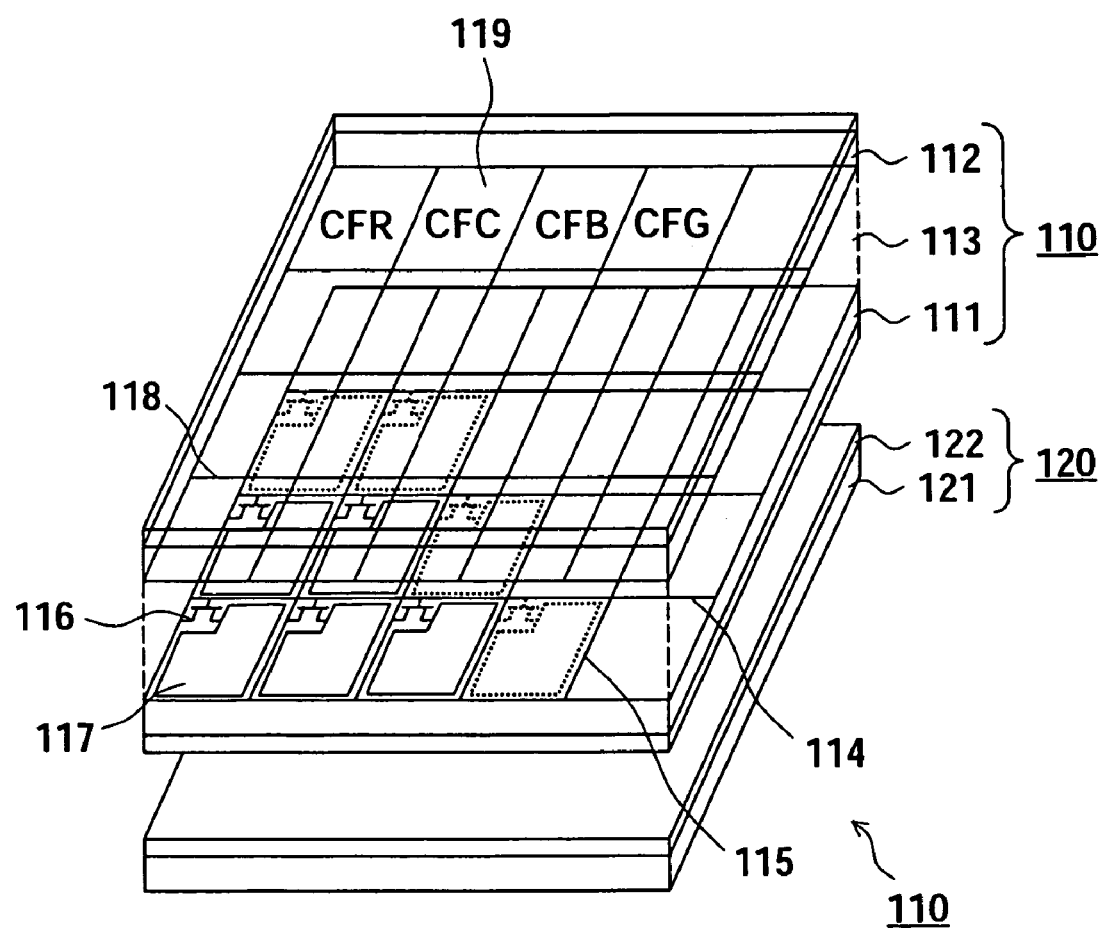
FIG. 13 is a view of an example of the configuration of a transmission type LCD panel.

FIG. 13 is a view of an example of the configuration of the transmission type LCD panel 110.

This transmission type LCD panel 110 is configured with a TFT substrate 111 and a counter electrode substrate 112 arranged opposite to each other. A liquid crystal layer 113 in which for example a twisted nematic (TN) liquid crystal is sealed is provided in a clearance thereof. The TFT substrate 111 is formed with signal lines 114 and scanning lines 115 arranged in a matrix and switching elements constituted by thin film transistors 116 and pixel electrodes 117 arranged at intersecting points of these lines. The thin film transistors 116 are successively selected by the scanning lines 115. Write video signals supplied from the signal lines 114 are written into corresponding pixel electrodes 117. On the other hand, an inside surface of the counter electrode substrate 112 is formed with counter electrodes 118 and color filters 119.

In the liquid crystal display system 100, the thus configured transmission type LCD panel 110 is sandwiched between two polarization plates. By driving it by an active matrix system in a state where white light is irradiated from the back surface by the backlight device 120, a desired full color video display is obtained.

The back light device 120 is provided with a light source 121 and a wavelength selection filter 122. The backlight device 120 directs the light emitted from the light source 121 via the wavelength selection filter 122 to the LCD panel 110 from the back surface.

The backlight device 120 is a type provided at the back surface of transmission type LCD panel 110 and illuminates the LCD panel 110 from immediately below the back surface. The light source 121 of the backlight device 120 uses a plurality of LEDs connected in series as the light emitting source. In the light source 121 of the backlight device 120, light emitting diodes aligned in the horizontal direction of a screen are connected in series whereby a plurality of light emitting diode groups connected in series in the horizontal direction are formed.

The thus configured backlight device 120 is driven by the LED drive device 130. As the LED drive device 130, the LED drive device of FIG. 9 to FIG. 11 explained above can be applied. In FIG. 12, the illustration is given of the case with the entire light source 121 driven by the LED drive device 130, but in actuality independent LED drive devices are individually provided in the light emitting diode groups 30 connected in series in the horizontal direction. Further, the LED drive device 130 employs the PWM control system as previously mentioned, but the PWM signal thereof is supplied by for example the signal processing circuit 150. The PWM control is carried out in the signal processing circuit 150 by control based on the adjustment of brightness by the user, by control by the APL, and by control for adjustment of the white balance of the red (R), green (G), and blue (B) colors.

The panel drive circuit 140 includes an X-driver circuit, a Y-driver circuit, etc. and displays a video in accordance with separate RGB signals by driving the LCD panel 110 by for example separate RGB signals supplied from the X-driver circuit and the Y-driver circuit by the signal processing circuit 150.

The signal processing circuit 150 performs signal processing such as chroma processing with respect to the input video signal and further converts the signal from a composite signal to separate RGB signals suitable for driving the LCD panel 110 and supplies the same to the panel drive circuit 140. Further, the signal processing circuit 150 supplies the PWM signal to the LED drive device 130 at a predetermined timing.

The thus configured liquid crystal display system 100 uses the LED drive devices of FIG. 9 to FIG. 11, therefore, when it is used with a back line using these environmentally friendly LEDs, simultaneous constant current control and PWM control become possible, and stable adjustment of the luminance in a wide dynamic range becomes possible. Further, by making the current value at the time of the constant current control variable, adjustment of the luminance in a further broader dynamic range becomes possible. Further, a current restricting resistor is not used for the constant current control. A resistor having a low resistance is also used for the current detection resistor. Therefore, there is the advantage that the highly efficient drive of an LED becomes possible.

It should be understood by those skilled in the art that various modifications, combinations, sub-combinations and alterations may occur depending on design requirements and other factors insofar as they are within the scope of the appended claims or the equivalents thereof.

The invention claimed is:

1. A light emitting element drive device comprising:
a light emitting unit including at least one light emitting element operable to emit light with a luminance in accordance with a flow of current;
a constant voltage source to supply the output voltage to the light emitting element of the light emitting unit;
a switch means operable to turn ON/OFF the output of the constant voltage source at a predetermined timing and to adjust light emission luminance of the light emitting element according to a ratio of ON/OFF states;
a current detecting means for detecting the value of a current flowing in the light emitting element;
a sample and hold means for holding the value of the output of the current detecting means when the switch means is ON; and
a controlling means for adjusting the output voltage of the constant voltage source so that the output value of the sample and hold means becomes a predetermined value,
in which the controlling means includes:
a constant current use reference voltage source,
a constant current control use error amplifier for comparing the output of the sample and hold means and the constant current use reference voltage from the constant current use reference voltage source,
a constant voltage use reference voltage source for changing the constant voltage use reference voltage in accordance with the output of the constant current control use error amplifier and outputting the same, and
a constant voltage control use error amplifier for comparing the output voltage of the constant voltage source and the constant voltage use reference voltage from the constant voltage use reference voltage source,
in which the output of the constant voltage source is controlled so as to become a value determined by the constant voltage use reference voltage in accordance with a result of comparison of the constant voltage control use error amplifier.

2. A light emitting element drive device as set forth in claim 1, wherein the sample and hold means includes a peak hold circuit for holding a peak value of the current detection value for a constant period.

3. A light emitting element drive device as set forth in claim 1, further comprising a means able to adjust the luminance of the light emitting element by changing the current value when the switch means is ON.

4. A light emitting element drive device as set forth in claim 2, wherein the constant current use reference voltage source can change the value of the constant current use reference voltage output by an external signal and can adjust the luminance of the light emitting element by changing the current value when the switch means is ON.

5. A light emitting element drive device as set forth in claim 1, wherein the switch means includes a transistor which is connected in series to the light emitting unit with respect to a voltage output line of the constant voltage source and having a control terminal to which a PWM signal in accordance with the ratio of ON/OFF states is supplied.

6. A light emitting element drive device as set forth in claim 5, wherein the constant voltage source includes a switching regulator, and the transistor is connected between a negative electrode of the switching regulator and the light emitting unit.

7. A light emitting element drive device as set forth in claim 6, wherein the current detecting means includes a resistor element connected between the light emitting unit and the negative electrode of the switching regulator and detects the current according to the potential difference across the resistor element.

8. A display apparatus comprising:
   a non-light emitting transmission type display unit;
   an illumination unit having a light emitting element provided on a back surface of the display unit and including at least one light emitting element operable to emit light with a luminance in accordance with a flow of current; and
   a light emitting element drive device for driving the light emitting element in the light emitting unit, wherein:
   the light emitting element drive device includes
   a constant voltage source to supply the output voltage to the light emitting element of the light emitting unit;
   a switch means operable to turn ON/OFF the output of the constant voltage source at a predetermined timing and to adjust light emission luminance of the light emitting element according to a ratio of ON/OFF states;
   a current detecting means for detecting the value of a current flowing in the light emitting element;
   a sample and hold means for holding the value of the output of the current detecting means when the switch means is ON; and
   a controlling means for adjusting the output voltage of the constant voltage source so that the output value of the sample and hold means becomes a predetermined value,
   in which the controlling means includes:
   a constant current use reference voltage source,
   a constant current control use error amplifier for comparing the output of the sample and hold means and the constant current use reference voltage from the constant current use reference voltage source,
   a constant voltage use reference voltage source for changing the constant voltage use reference voltage in accordance with the output of the constant current control use error amplifier and outputting the same, and
   a constant voltage control use error amplifier for comparing the output voltage of the constant voltage source and the constant voltage use reference voltage from the constant voltage use reference voltage source,
   in which the output of the constant voltage source is controlled so as to become a value determined by the constant voltage use reference voltage in accordance with a result of comparison of the constant voltage control use error amplifier.

\* \* \* \* \*

UNITED STATES PATENT AND TRADEMARK OFFICE
CERTIFICATE OF CORRECTION

PATENT NO. : 7,312,783 B2  
APPLICATION NO. : 11/247665  
DATED : December 25, 2007  
INVENTOR(S) : Yoshiki Oyama It is certified that error appears in the above-identified patent and that said Letters Patent is hereby corrected as shown below:

Column 1, line 30, "television" should read --television,--;

Column 3, line 53, "becomes" should read --become--;

Column 5, line 18, "the and" should read --the current input valve and--;

Column 5, line 60, "example on" should read --example one--;

Column 5, line 64, "ohms" should read --ohm--;

Column 8, line 4, "can configured" should read --can be configured--;

Column 12, line 61, "claim 2," should read --claim 1,--;

Column 13, line 25, "includes" should read --includes:--.

Signed and Sealed this

Third Day of March, 2009

JOHN DOLL  
*Acting Director of the United States Patent and Trademark Office*

UNITED STATES PATENT AND TRADEMARK OFFICE
CERTIFICATE OF CORRECTION

PATENT NO. : 7,312,783 B2 Page 1 of 1
APPLICATION NO. : 11/247665
DATED : December 25, 2007
INVENTOR(S) : Yoshiki Oyama It is certified that error appears in the above-identified patent and that said Letters Patent is hereby corrected as shown below:

Column 1, line 30, "television" should read --television,--;

Column 3, line 53, "becomes" should read --become--;

Column 5, line 18, "the and" should read --the current input valve and--;

Column 5, line 60, "example on" should read --example one--;

Column 5, line 64, "ohms" should read --ohm--;

Column 8, line 14, "can configured" should read --can be configured--;

Column 12, line 61, "claim 2," should read --claim 1,--;

Column 13, line 25, "includes" should read --includes:--.

This certificate supersedes the Certificate of Correction issued March 3, 2009.

Signed and Sealed this

Nineteenth Day of May, 2009

JOHN DOLL
*Acting Director of the United States Patent and Trademark Office*